United States Patent
Tsai

(10) Patent No.: US 10,515,105 B2
(45) Date of Patent: Dec. 24, 2019

(54) COMPUTER AUTOMATICALLY IMPLEMENTED ELEMENT-NOUN REFERENCE NUMERAL ACQUIRING METHOD FOR ACQUIRING ELEMENT-NOUN REFERENCE NUMERAL OF CLAIM-ELEMENT-NOUN

(71) Applicant: INTEGRAL SEARCH TECHNOLOGY LTD., Taipei (TW)

(72) Inventor: Hong-Shin Tsai, Taipei (TW)

(73) Assignee: INTEGRAL SEARCH TECHNOLOGY LTD., Taipei (TW)

( * ) Notice: Subject to any disclaimer, the term of this patent is extended or adjusted under 35 U.S.C. 154(b) by 317 days.

(21) Appl. No.: 15/585,008

(22) Filed: May 2, 2017

(65) Prior Publication Data

US 2017/0344629 A1 Nov. 30, 2017

(30) Foreign Application Priority Data

May 27, 2016 (TW) .............................. 105116756 A

(51) Int. Cl.
*G06F 16/00* (2019.01)
*G06F 16/33* (2019.01)
(Continued)

(52) U.S. Cl.
CPC .......... *G06F 16/334* (2019.01); *G06F 16/338* (2019.01); *G06F 17/277* (2013.01); *G06Q 50/184* (2013.01)

(58) Field of Classification Search
CPC .... G06F 16/334; G06F 16/338; G06F 17/277; G06F 16/00; G06F 17/30; G06F 16/367;
(Continued)

(56) References Cited

U.S. PATENT DOCUMENTS 5,642,522 A * 6/1997 Zaenen ................. G06F 17/274
704/9
5,774,833 A * 6/1998 Newman ............... G06F 17/211
704/9
(Continued)

FOREIGN PATENT DOCUMENTS

TW 200506655 A 2/2005
TW 200630827 A 9/2006
(Continued)

*Primary Examiner* — Anh Ly
(74) *Attorney, Agent, or Firm* — Maschoff Brennan

(57) ABSTRACT

The invention discloses a computer automatically implemented element-noun reference numeral acquiring method that acquires an element-noun reference numeral of a claim-element-noun from a patent claim. The computer automatically implemented element-noun reference numeral acquiring method has an element-noun reference numeral retrieving step and an element-noun reference numeral correlating step. The element-noun reference numeral retrieving step retrieves a claim-element-noun and/or a specification-element-noun according to a rule related to a noun-initial word and part of speech. In addition, the element-noun reference numeral retrieving step retrieves a specification-element-noun possible word string according to an element-noun determining word. The element-noun reference numeral correlating step builds a correlated relationship between the claim-element-noun reference numeral retrieved from the element-noun reference numeral retrieving step and the claim-element-noun.

16 Claims, 7 Drawing Sheets

(51) Int. Cl.
*G06F 16/338* (2019.01)
*G06F 17/27* (2006.01)
*G06Q 50/18* (2012.01)

(58) Field of Classification Search
CPC ............ G06F 17/2775; G06F 17/2705; G06F 17/30911; G06F 17/30112; G06F 17/241; G06F 16/93; G06Q 50/184
See application file for complete search history.

(56) References Cited

U.S. PATENT DOCUMENTS

| | | | | |
|---|---|---|---|---|
| 6,516,321 | B1* | 2/2003 | De La Huerga | G06F 17/22 |
| 7,890,851 | B1* | 2/2011 | Milton, Jr. | G06F 17/248 |
| | | | | 705/310 |
| 2002/0077832 | A1* | 6/2002 | Leonid | G06F 17/2235 |
| | | | | 704/276 |
| 2002/0107896 | A1* | 8/2002 | Ronai | G06F 17/21 |
| | | | | 715/261 |
| 2003/0126128 | A1* | 7/2003 | Watson | G06F 17/218 |
| 2004/0168129 | A1* | 8/2004 | Roebuck | G06F 17/243 |
| | | | | 715/255 |
| 2005/0216828 | A1* | 9/2005 | Brindisi | G06F 17/241 |
| | | | | 715/201 |
| 2009/0138466 | A1* | 5/2009 | Henry | G06F 16/40 |
| | | | | 707/E17.014 |
| 2010/0145940 | A1 | 6/2010 | Chen et al. | |
| 2011/0082876 | A1* | 4/2011 | Lu | G06F 16/93 |
| | | | | 707/769 |
| 2012/0226492 | A1* | 9/2012 | Tsuboi | G06F 16/3344 |
| | | | | 704/9 |
| 2013/0246436 | A1* | 9/2013 | Levine | G06F 17/241 |
| | | | | 707/741 |
| 2013/0317994 | A1* | 11/2013 | Tran | G06Q 50/184 |
| | | | | 705/310 |
| 2014/0317097 | A1* | 10/2014 | Elias | G06F 7/00 |
| | | | | 707/722 |
| 2015/0293932 | A1 | 10/2015 | Takeda et al. | |
| 2016/0048936 | A1* | 2/2016 | Perkowski | G06Q 10/063 |
| | | | | 705/310 |
| 2017/0039281 | A1* | 2/2017 | Venkata | G06F 16/248 |

FOREIGN PATENT DOCUMENTS

TW 201500939 A 1/2015
TW 201636875 A 10/2016

* cited by examiner

| | Group of noun-initial words | Group of subordinate verb words | Group of preposition words | Group of relative pronoun words | Group of participle words | Group of exception words | Group of adverb-word-end words | Group of compulsory breaking words |
|---|---|---|---|---|---|---|---|---|
| 1 | a | being | to | who | ed | making | ly | ; |
| 2 | an | is | on | which | ing | of | | : |
| 3 | the | are | in | where | NOT(Group of exceptional performance) | a manner | | when |
| 4 | said | can | between | wherein | | | | while |
| 5 | | may | at | | | | | after |
| 6 | | will | | | | | | before |
| 7 | | | | | | | | during |

FIG.2

| | Group of noun-initial words | Target noun words | Group of relative pronoun words | Group of subordinate verb words | Group of participle words | Group of adverb words | Group of preposition words | Group of interruption words | Group of noun-initial words | Group of relative pronoun words | Group of first participle words | Group of compulsory breaking words |
|---|---|---|---|---|---|---|---|---|---|---|---|---|
| 1 | ○ | 1+ | | ○ | | | | | | | | |
| 2 | ○ | 1+ | | | | | ○ | | | ○ | | |
| 3 | ○ | 1+ | ● | | | | | | | | | |
| 4 | ○ | 1+ | | ● | | | | | | | | |
| 5 | ○ | 1+ | | | ● | | ○ | | | | | |
| 6 | ○ | 1+ | | | ● | | | ○ | | | | |
| 7 | ○ | 1+ | | | ● | | | | ○ | | | |
| 8 | ○ | 1+ | | | ● | | | | | ○ | | |
| 9 | ○ | 1+ | | | ● | | | | | | | |
| 10 | ○ | 1+ | | | | | ● | | ○ | | | |
| 11 | ○ | 1+ | | | | | ● | ● | | ○ | | |
| 12 | ○ | 1+ | | | | | ● | ● | ○ | | | |
| 13 | ○ | 1+ | | | | | | ● | | | | |
| 14 | ○ | 1+ | | | | | | ● | | | ○ | |
| 15 | ○ | 1+ | | | | | ○ | ○ | | | ○ | |
| 16 | ○ | 1+ | | | | ● | | | | | | |
| 17 | ○ | 1+ | | | | ● | | | | | | ○ |
| 18 | ○ | 1+ | | | | | | | | | | ● |

● Position of sentence-breaking word
○ Determining condition

FIG.3

| Table of element-noun determining word | The | Said | Of | Regarding | With | Above-mentioned | Aforementioned | Above | Below |
|---|---|---|---|---|---|---|---|---|---|

FIG.7

COMPUTER AUTOMATICALLY IMPLEMENTED ELEMENT-NOUN REFERENCE NUMERAL ACQUIRING METHOD FOR ACQUIRING ELEMENT-NOUN REFERENCE NUMERAL OF CLAIM-ELEMENT-NOUN

FIELD OF THE INVENTION

The present invention relates to a computer automatically implemented reference numeral acquiring method that acquires a claim-element-noun reference numeral of a claim by specifically using a noun-initial word and an element-noun determining word or by using an element-noun determining word.

BACKGROUND OF THE INVENTION

A patent application mainly consists of a specification, a claim and a drawing. The claim is generally defined by a preamble having a subject matter, and a body having a plurality of elements together with their detailed technical definition. The elements can be classified as a primary element and a secondary element according to interrelationship there between in the claim. The element to which the present invention is referred includes the subject matter, the primary element and the secondary element. An element-noun is referred to data that is retrieved from the claim. The detail description for the element-noun is found in the specification. It is noted that a reference numeral corresponding to an element-noun is shown in the specification as well as the drawing. The same reference numeral represents the same element-noun in the specification and the drawings such that the reading of the patent specification becomes easy.

Taking US patents as an example, the element-nouns thereof are not shown with reference numeral to which the element-nouns belongs in the claim. It causes the inconvenience to a patent reader when he/she reads the patent claim for technical analysis, since the definition and the explanation of an element-noun scatters in different sections of a patent application, including specification, claims and drawings. Especially when a patent reader watches a computer monitor to read the patent claim, the limited size of screen is only large enough to display a portion of patent claims not mention the specification and the drawings such that the most of other sections that shows the reference numeral of the element-noun cannot be seen.

In other words, when a patent reader reads and analyzes the technical contents of a patent, he/she needs to turn to other pages in the specification to find out the reference numeral which corresponds to the element-noun in desire. Thereafter, he/she needs to turn to the pages in the drawings to find out the specific position to find out the reference numeral. The above has to be repeatedly continued to have all element-nouns in the claims to be found while he/she is reading the claims, the specification and the drawings. Moreover, a patent reader has to mark up the reference numerals in the claims to conclude the meaning of the claims in order to exactly understand the technical features of the patent claims.

That is to say, a complete understanding of a patent claim can only be achieved by cross-reference of the claim, the specification and the drawings. It is inevitably time-wasting when a patent reader has to forward and backward reading different sections in a patent application. Even if a patent reader can open several different windows for obtaining a reference numeral in these difference sections, it is also bothering. The above situations explain why a patent reader is difficult to read a patent in a comparative short time. Moreover, when the amount of element-noun is plenty, an error tends to be caused.

SUMMARY OF THE INVENTION

Therefore, an objective of the present invention is to provide a computer automatically implemented element-noun reference numeral acquiring method that acquires a claim-element-noun reference numeral of a claim to display the claim-element-noun reference numeral together with the claim-element-noun in the patent claims. Meanwhile, the technical feature defined in claims, specification and drawings in a patent application can be read in a simultaneous manner that a patent reader can understand the technical features rapidly.

In order to achieve the above, the present invention provides a computer automatically implemented element-noun reference numeral acquiring method that acquires a claim-element-noun reference numeral of a claim. The computer automatically implemented element-noun reference numeral acquiring method has: an element-noun reference numeral retrieving step, and an element-noun reference numeral correlating step. The element-noun reference numeral retrieving step searches a specification to retrieve the claim-element-noun reference numeral belonging to a claim-element-noun. The element-noun reference numeral correlating step establishes a correlated relationship between the claim-element-noun reference numeral and the claim-element-noun of the claim, the claim-element-noun reference numeral being obtained by the element-noun reference numeral retrieving step. The element-noun reference numeral retrieving step performs any one of the following three manners. (1) The first manner: after the claim-element-noun of the claim is retrieved in the claim, it searches the specification to retrieve a specification-element-noun and a specification-element-noun reference numeral so as to connect the specification-element-noun reference numeral and the claim-element-noun, the specification-element-noun being corresponded to the claim-element-noun, and the specification-element-noun reference numeral belonging to the specification-element-noun. (2) The second manner: after the specification-element-noun and the specification-element-noun reference numeral belonging to the specification-element-noun are retrieved in the specification, it searches the claim to retrieve the claim-element-noun which corresponds to the specification-element-noun so as to connect the specification-element-noun reference numeral and the claim-element-noun. (3) The third manner: after the specification-element-noun reference numeral and at least one specification-element-noun possible word string corresponding to the specification-element-noun reference numeral are retrieved in the specification, it searches the claim to retrieve the claim-element-noun which corresponds to the specification-element-noun possible word string in such a manner that it compares in a reverse sequence beginning from an end of the claim-element-noun and an end of the specification-element-noun possible word string so as to connect the specification-element-noun reference numeral and the claim-element-noun. The retrieval of the claim-element-noun in the claim and the retrieval of the specification-element-noun in the specification performed in the first manner and the second manner are executed according to a noun-initial word and an element-noun determining word which are regulated in an element-noun determining rule table employing noun-initial word and part of speech. The retrieval of the specification-element-noun possible word string in the specification performed in the third manner is executed according to an element-noun determining word.

In one embodiment of the present invention, an computer automatically implemented element-noun reference numeral acquiring method is provided., The retrieval of the specification-element-noun in the specification and the retrieval of the specification-element-noun reference numeral belonging to the specification-element-noun in the specification defined in the second manner of the element-noun reference numeral retrieving step are performed by retrieving an element-noun reference numeral and a specification-element-noun proximately neighboring in front of the element-noun reference numeral such that the element-noun reference numeral is taken as the specification-element-noun reference numeral of the specification-element-noun.

In one embodiment of the present invention, a computer automatically implemented element-noun reference numeral acquiring method is provided. The element-noun reference numeral correlating step includes a displaying step which displays a correlated relationship between the claim-element-noun reference numeral and the claim-element-noun, the claim-element-noun reference numeral belonging to the claim-element-noun and corresponding to the claim-element-noun.

In one embodiment of the present invention, a computer automatically implemented element-noun reference numeral acquiring method is provided. The third manner further includes a specification-element-noun-representative determining sub-step which groups the specification-element-noun possible word strings into at least one specification-element-noun reference numeral group according to the specification-element-noun reference numerals, compares all specification-element-noun possible word strings in one specification-element-noun reference numeral group in such a manner that it compares in a reverse sequence beginning from the end of each specification-element-noun possible word string in said one specification-element-noun reference numeral group, and takes the specification-element-noun possible word string having all words containing with the same sequence in all other specification-element-noun possible word strings in said one specification-element-noun reference numeral group as a specification-element-noun-representative of said one specification-element-noun reference numeral group, and retrieves the specification-element-noun-representative from the claim to obtain a claim-element-noun position so as to display the specification-element-noun reference numeral in a position corresponding to the claim-element-noun position.

In one embodiment of the present invention, a computer automatically implemented element-noun reference numeral acquiring method is provided. When the specification-element-noun-representative determining sub-step is performed and determines that there is not any specification-element-noun-representative of said one specification-element-noun reference numeral group, it retrieves all specification-element-noun possible word strings of said one specification-element-noun reference numeral group from the claim to obtain the claim-element-noun position of each claim-element-noun so as to display the specification-element-noun reference numeral in a position corresponding to the claim-element-noun position.

In one embodiment of the present invention, a computer automatically implemented element-noun reference numeral acquiring method is provided. The specification-element-noun-representative determining sub-step further retrieves a claim-element-noun possible word string according to the element-noun determining word, and compares the specification-element-noun-representative with the claim-element-noun possible word string in such a manner that it compares in a words-reverse-sequence beginning from an end word of the specification-element-noun-representative and an end word of the claim-element-noun possible word string so as to retrieve the specification-element-noun-representative from the claim.

In one embodiment of the present invention, a computer automatically implemented element-noun reference numeral acquiring method is provided. The retrieval from the claim performed in the specification-element-noun-representative determining sub-step further retrieves a claim-element-noun possible word string in the claim according to the element-noun determining word so as to compare all the specification-element-noun possible word strings in the specification-element-noun reference numeral group with the claim-element-noun possible word string.

In one embodiment of the present invention, a computer automatically implemented element-noun reference numeral acquiring method is provided. The operation that compares all specification-element-noun possible word strings in the specification-element-noun reference numeral group with the claim-element-noun possible word string is performed in a words-reverse-sequence from an end word of each specification-element-noun possible word string and an end word of each claim-element-noun possible word string and on a basis of a string length from the longest length to the shortest length of the specification-element-noun possible word string to compare the specification-element-noun possible word string with the claim-element-noun possible word string.

In one embodiment of the present invention, a computer automatically implemented element-noun reference numeral acquiring method is provided. The specification-element-noun-representative determining sub-step compares the specification-element-noun-representative and the claim-element-noun in a words-reverse-sequence from an end word of each specification-element-noun-representative and an end word of each claim-element-noun and on a basis of a string length from the longest length to the shortest length of the specification-element-noun-representative.

In one embodiment of the present invention, a computer automatically implemented element-noun reference numeral acquiring method is provided. The element-noun reference numeral correlating step includes a specification displaying step, the specification displaying step displaying a specification sectional content and/or displaying a specification sectional content together with the claim-element-noun and/or displaying a specification sectional content together with the claim-element-noun reference numeral, wherein the specification sectional content is a sectional content in the specification containing the specification-element-noun that corresponds to the claim-element-noun and/or corresponds to the claim-element-noun reference numeral.

In one embodiment of the present invention, a computer automatically implemented element-noun reference numeral acquiring method is provided. The element-noun reference numeral correlating step includes a specification-sectional-content-to-drawing mapping step, the specification-sectional-content-to-drawing mapping step displaying a drawing and/or displaying a drawing together with the claim-element-noun and/or displaying a drawing together with the claim-element-noun reference numeral, wherein the drawing contains the claim-element-noun and/or the claim-element-noun reference numeral, and wherein the specification-element-noun, the claim-element-noun, the claim-element-noun reference numeral and a drawing-noun belonging to the same specification section are connected with a correlated relationship, the drawing-noun including a number representing a sequence of drawings.

In one embodiment of the present invention, a computer automatically implemented element-noun reference numeral acquiring method is provided. When one paragraph has a plurality of the drawing-nouns, the specification-sectional-content-to-drawing mapping step includes a same-specification-section-to-drawing mapping sub-step, the same-specification-section-to-drawing mapping sub-step dividing one paragraph into a plurality of sectional block according to the drawing-noun, combining all sectional blocks without the drawing-noun between two sectional blocks with the different drawing-nouns into a previous one of the two sectional blocks, and connecting the previous one of the two sectional blocks with a correlated relationship with the claim-element-noun and/or the claim-element-noun reference numeral according to a relationship in connecting to the claim-element-noun and/or the claim-element-noun reference numeral.

In one embodiment of the present invention, a computer automatically implemented element-noun reference numeral acquiring method is provided. The specification-sectional-content-to-drawing mapping step includes a multiple-specification-section-to-drawing mapping sub-step, the multiple-specification-section-to-drawing mapping sub-step combining all sectional blocks without the drawing-noun into the previous sectional block with the drawing-noun, and connecting the previous sectional blocks with a correlated relationship with the claim-element-noun and/or the claim-element-noun reference numeral according to a relationship in connecting to the claim-element-noun and/or the claim-element-noun reference numeral.

In one embodiment of the present invention, a computer automatically implemented element-noun reference numeral acquiring method is provided. When the element-noun reference numeral retrieving step cannot retrieve the claim-element-noun reference numeral corresponding to the claim-element-noun from the specification, the element-noun reference numeral retrieving step displays a similar specification-element-noun which is the specification-element-noun similar to the claim-element-noun such that the similar specification-element-noun can be chosen.

In one embodiment of the present invention, a computer automatically implemented element-noun reference numeral acquiring method is provided. When the drawing-noun with correlated relationship with the specification-element-noun, the claim-element-noun and/or the claim-element-noun reference numeral is a plurality of ones, each one of the plurality of drawing-nouns is displayed as an icon such that each icon can be chosen.

In one embodiment of the present invention, a computer automatically implemented element-noun reference numeral acquiring method is provided and further includes a selected-drawing displaying step, the selected-drawing displaying step displaying a specification section on a displaying device when a displaying icon is displayed and chosen in the displaying device.

In one embodiment of the present invention, a computer automatically implemented element-noun reference numeral acquiring method is provided and further includes a selected-paragraph displaying step, the selected-paragraph displaying step displaying a drawing corresponding to a selected paragraph and/or displaying the claim-element-noun corresponding to the selected paragraph, when the selected paragraph is displayed on the displaying device and is chosen, wherein the selected paragraph is with the claim-element-noun or the specification-element-noun.

By means of the present invention, in addition to that the element-noun reference numeral of element-noun can be retrieved so as to place the retrieved element-noun reference numeral in a position corresponding to the element-noun in the patent claim, the present invention builds the interrelationships among element-noun in claims, specification and drawings to ease a patent reader for patent understanding. The present invention provides a mechanism that, after a patent reader chooses an element-noun in claims, specification or drawings, a content corresponding to the chosen element-noun in all other sections of claims, specification and drawings can be displayed. Preferably, the drawings in relation to an element-noun chosen in the claims are arranged and are displayed to a patent reader. In summary, the present invention enables a patent reader to read a patent more efficiently and thoroughly.

BRIEF DESCRIPTION OF THE DRAWINGS

FIG. 2 shows a table of part of speech according to part of speech in the present invention.

FIG. 3 shows a logical table of the present invention.

FIG. 7 shows an element-noun determining word table of the present invention.

DETAILED DESCRIPTION OF THE PREFERRED EMBODIMENTS

With reference to FIGS. 1 to 7, the embodiments of the present invention are described. The description does not limit the scope of the embodiments but is one of the embodiments of the present invention.

Figure 1:
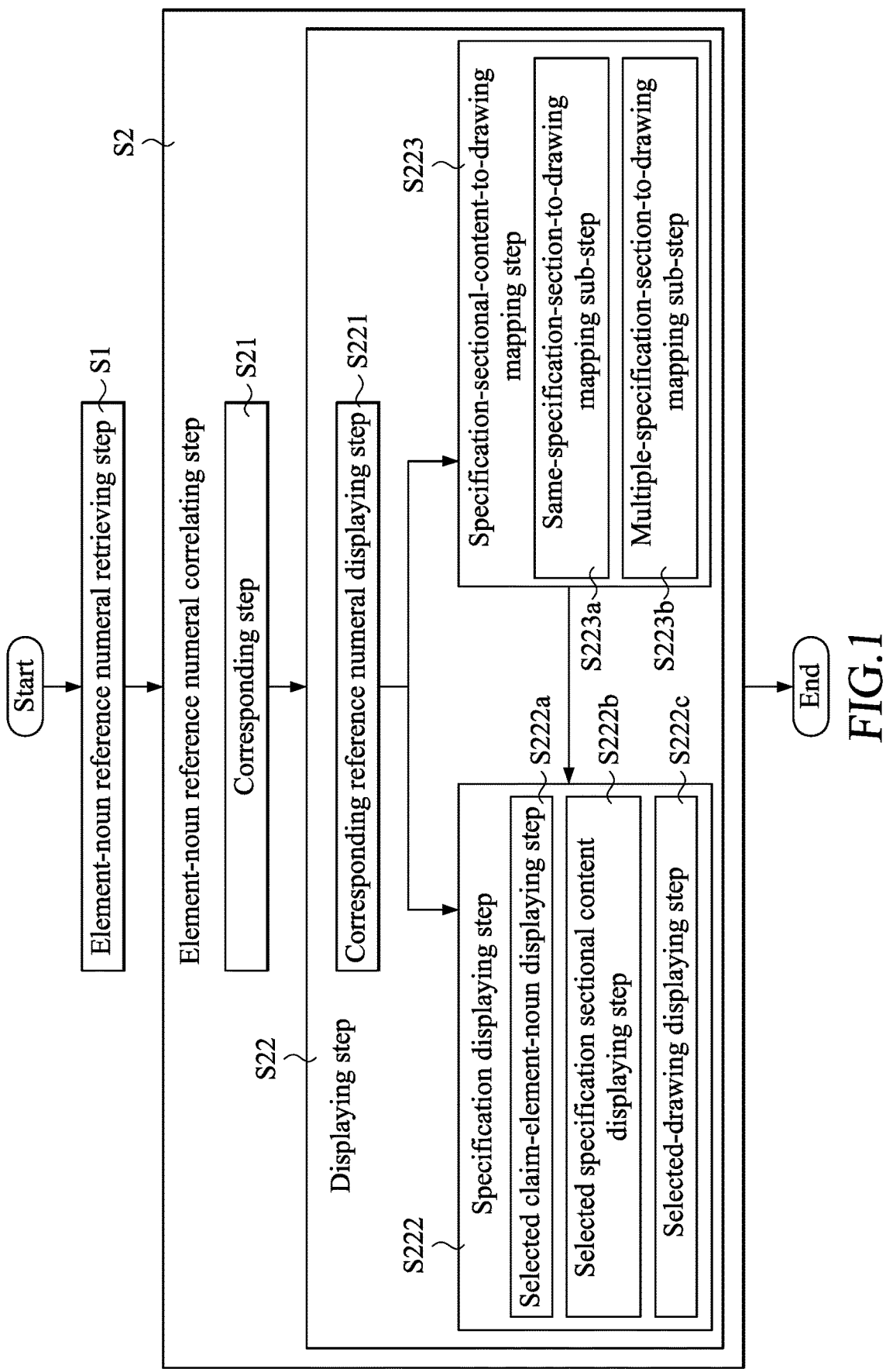
FIG. 1 shows a flow diagram of a computer automatically implemented element-noun reference numeral acquiring method according to one embodiment of the present invention.

As shown in FIG. 1, it provides a computer automatically implemented element-noun reference numeral acquiring method that acquires an element-noun reference numeral of a claim-element-noun from a patent claim. The computer automatically implemented element-noun reference numeral acquiring method for acquiring an element-noun reference numeral of a claim-element-noun has an element-noun reference numeral retrieving step S1 and an element-noun reference numeral correlating step S2. Specifically, the element-noun reference numeral retrieving step S1 and the element-noun reference numeral correlating step S2 can be applied to an English patent application, a Chinese patent application or a Japanese patent application as long as the patent specification of the patent application has (1) a noun-initial word and an element-noun determining word which are under a regulation of a rule related to noun-initial word and part of speech, as defined in the first embodiment and the second embodiment of the present invention; and (2)

an element-noun determining word located neighboring in front of the element-noun, as defined in the third embodiment of the present invention.

The element-noun reference numeral retrieving step S1 has three embodiments including the first embodiment, the second embodiment and the third embodiment. (1) The first embodiment: after the claim-element-noun is retrieved from claims, it searches the specification to retrieve a specification-element-noun corresponding to the claim-element-noun, and accordingly it retrieves a specification-element-noun reference numeral belonging to the specification-element-noun such that the claim-element-noun has been built a corresponding relationship with the specification-element-noun reference numeral. (2) The second embodiment: after the specification-element-noun and the specification-element-noun reference numeral belonging to the specification-element-noun are retrieved from the specification, it searches the claim to retrieve the claim-element-noun which corresponds to the specification-element-noun such that the claim-element-noun has been built a corresponding relationship with the specification-element-noun reference numeral. (3) The third embodiment: after the specification-element-noun reference numeral and at least one specification-element-noun possible word string which corresponds to the specification-element-noun reference numeral are retrieved from the specification, it searches the claim to retrieve the claim-element-noun which corresponds to the specification-element-noun possible word string in such a manner that it compares in a reverse sequence beginning from an end of the claim-element-noun and an end of the specification-element-noun possible word string such that the claim-element-noun has been built a corresponding relationship with the specification-element-noun reference numeral. The retrieval of the claim-element-noun from the claim and the retrieval of the specification-element-noun from the specification operated in the first embodiment and the second embodiment are executed according to a noun-initial word and an element-noun determining word under a regulation of an element-noun determining rule table employing noun-initial word and part of speech. The retrieval of the specification-element-noun possible word string from the specification operated in the third embodiment is executed according to an element-noun determining word.

In the present invention, an element-noun in the claim is referred to a claim-element-noun, and an element-noun in the specification is referred to a specification-element-noun. An element-noun reference numeral following the specification-element-noun is taken as belonging to the specification-element-noun and is referred to the specification-element-noun reference numeral.

In the first embodiment of the element-noun reference numeral retrieving step S1, after the claim-element-noun of claim is retrieved from the claim, it searches the specification to retrieve a specification-element-noun which correspondingly matches the claim-element-noun and further retrieves a specification-element-noun reference numeral following the specification-element-noun. For example, after an element-noun "circuit board" is retrieved from the claim, the element-noun "circuit board" and the element-noun reference numeral following the "circuit board" are then retrieved from the specification. The retrieved element-noun reference numeral is taken as a claim-element-noun reference numeral for the claim-element-noun.

In the second embodiment of the element-noun reference numeral retrieving step S1, after the specification-element-noun and the specification-element-noun reference numeral following the specification-element-noun are together retrieved from the specification, it searches the claim to retrieve the claim-element-noun which correspondingly match the specification-element-noun such that the claim-element-noun has been built a corresponding relationship with the specification-element-noun reference numeral. In the second embodiment, alternatively, the specification-element-noun reference numeral is searched out from the specification, and the specification-element-noun neighboring in front of the specification-element-noun reference numeral is also retrieved. Then, the claim-element-noun correspondingly matching the specification-element-noun is searched out from the claim such that the claim-element-noun has been built a corresponding relationship with the specification-element-noun reference numeral.

In either the first embodiment or the second embodiment, the element-noun reference numeral retrieving operation to the claim and to the specification is operated in accordance with a table of part of speech and a rule related to a noun-initial word and part of speech, as shown in FIG. 2. The table of part of speech is provides with a noun-initial word and an element-noun determining word which are used for retrieving the claim-element-noun and the specification-element-noun. In detail, as shown in FIG. 2, the table of part of speech includes a plurality of groups of part of speech words including: (1) a group of noun-initial words, i.e., an indefinite article and a definite article, such as "a", "the", and other words such as "said"; (2) a group of relative pronoun words; (3) a group of preposition words; (4) a group of participle-word-end words; (5) a group of adverb-word-end words. The table of part of speech is applied in the present invention to be with advantage that it does not require to recognize each word in the parsing paragraphs but only need to follow a rule related to part of speech with a few of exception situations to complete a complicated parsing operation.

The table of part of speech in FIG. 2 is used by combining an element-noun determining rule table in FIG. 3 to determine an element-noun determining point. Hereinafter, with reference to FIG. 3, the rule of element-noun determining word of the present invention will be illustrated for which a sentence, "a circuit board provided with edges extending in a longitudinal direction of said circuit board;" is taken as an example for describing how the claim-element-noun or the specification-element-noun is retrieved. The first row of the table is illustrated with title names of groups classified by part of speech. The title name of groups by part of speech includes: (1) a group of noun-initial words, (2) a group of subordinate verb words, (3) a group of preposition words, (4) a group of relative pronoun words, (5) a group of participle words, (6) a group of exceptional words, (7) a group of adverb-word-end words, and (8) a group of compulsory breaking words. When a noun-initial word, such as 'a', 'the' or 'said' is read as illustrated with a mark of "○" in the table, it continues to read the following words after the noun-initial word until one following word is with its part of speech matching any group in the table marked with "●". Then the matched word found is taken as a temporary element-noun determining point word. Then it continues to read the following words after the temporary element-noun determining point word until one following word is found its part of speech matching with any group in the table marked with "○" shown in the same row after the mark "●", It is noted that when the matching word is found as marked with "○", then the temporary element-noun determining point word marked with "●" is then determined as an element-noun determining point word such that the words from the initial-noun word marked with "○" to the word in front of the sentence breaking point word marked with "●" will be taken as an element noun.

For example, firstly 'a' is read from the exemplary sentence of "'a' circuit board provided with edges extending in a longitudinal direction of said circuit board;". Since the word of "a" is one of the words belonging to "a group of the noun-initial words", therefore the word of "a" can be considered as meeting one of the situations illustrated in the second column with label numbers from 1 to 18 in FIG. 3 as marked with "a". Secondly, 'circuit' is read from the exemplary sentence, illustrated as "a 'circuit' board provided with edges extending in a longitudinal direction of said circuit board;". Since the "circuit" does not belong to any group by part of speech, therefore the sentence reading will go continuously to the following word of "circuit" until one following word is found its part of speech matching with any group by part of speech in the table. Thirdly, 'board' is read from the exemplary sentence, illustrated as "a circuit 'board' provided with edges extending in a longitudinal direction of said circuit board;". Since the word of "board" is with the same situation as the word of "circuit" that it does not belong to any group by part of speech in the table, therefore the sentence reading will go continuously. Fourthly, 'provided' is read from the exemplary sentence, illustrated as "a circuit board 'provided' with edges extending in a longitudinal direction of said circuit board;". Since the word of "provided" is with an 'ed' form in its end and the word "provided" is not a word in a participle-word exception word list, thus it belongs to the group of participle-word-end words. Therefore the word of "provided" is marked with "●" as a temporary element-noun determining point word. Fifthly, 'with' is read from the exemplary sentence, illustrated as "a circuit board provided 'with' edges extending in a longitudinal direction of said circuit board;". Since the "with" belongs to the group of preposition words, therefore the word of "with" is marked with "○", which will determine the temporary element-noun determining point word as the element-noun determining point word. The above procedure can be found in the 7$^{th}$ row with a label number of 5 in the table of FIG. 3. Therefore, the temporary element-noun determining point word is determined. Accordingly, the words from the initial-noun word marked with "○", which is the word of 'a' in front of the word 'circuit', to the word in front of the element-noun determining point word marked with "●", which is the word 'board', will be determined as an element noun. In conclusion, the element noun including the claim-element-noun and the specification-element-noun defined in the claim and the specification can be obtained.

In the first embodiment of the element-noun reference numeral retrieving step S1, the above mentioned rule of element-noun determining word is operated to retrieve a claim-element-noun from the claim, and then retrieve the specification-element-noun correspondingly matching the claim-element-noun from the specification. Furthermore, the element-noun reference numeral following the specification-element-noun is retrieved and is taken as a claim-element-noun reference numeral.

Alternatively, in the second embodiment of the element-noun reference numeral retrieving step S1, the above mentioned rule of element-noun determining word is operated to retrieve the specification-element-noun, and then retrieve the element-noun reference numeral following the specification-element-noun as being the specification-element-noun reference numeral. Thereafter, the claim-element-noun that is identical to the specification-element-noun is retrieved from the claim such that the specification-element-noun reference numeral is disposed in a position corresponding to the claim-element-noun, which is in front of the claim-element-noun, in back of the claim-element-noun, or is any position which illustrates a positional corresponding relationship with the claim-element-noun.

The retrieval of claim-element-noun in the first embodiment and the retrieval of the specification-element-noun in the second embodiment are operated by applying the table of part of speech shown in FIG. 2 and the rule of element-noun determining word shown in FIG. 3. In other words, the claim-element-noun and the specification-element-noun are retrieved according to a noun-initial word and an element-noun determining word under a rule related to a noun-initial word and part of speech.

The follows explain the third embodiment of the element-noun reference numeral retrieving step S1. The third embodiment particularly applies to a Chinese patent application, but not limit to this. It can also apply to a Japanese patent application and any other patent application which is not with a noun-initial word. The third embodiment of the element-noun reference numeral retrieving step S1 firstly retrieves: (1) the specification-element-noun reference numeral in the specification, and (2) at least one specification-element-noun possible word string corresponding to the specification-element-noun reference numeral. Then it compares in a reverse sequence beginning from an end of the claim-element-noun and an end of the specification-element-noun possible word string to build a corresponding relationship between the claim-element-noun and the specification-element-noun reference numeral. The third embodiment only applies a group of element-noun determining words but does not apply a noun-initial word for retrieving the specification-element-noun possible word string.

Figure 6:
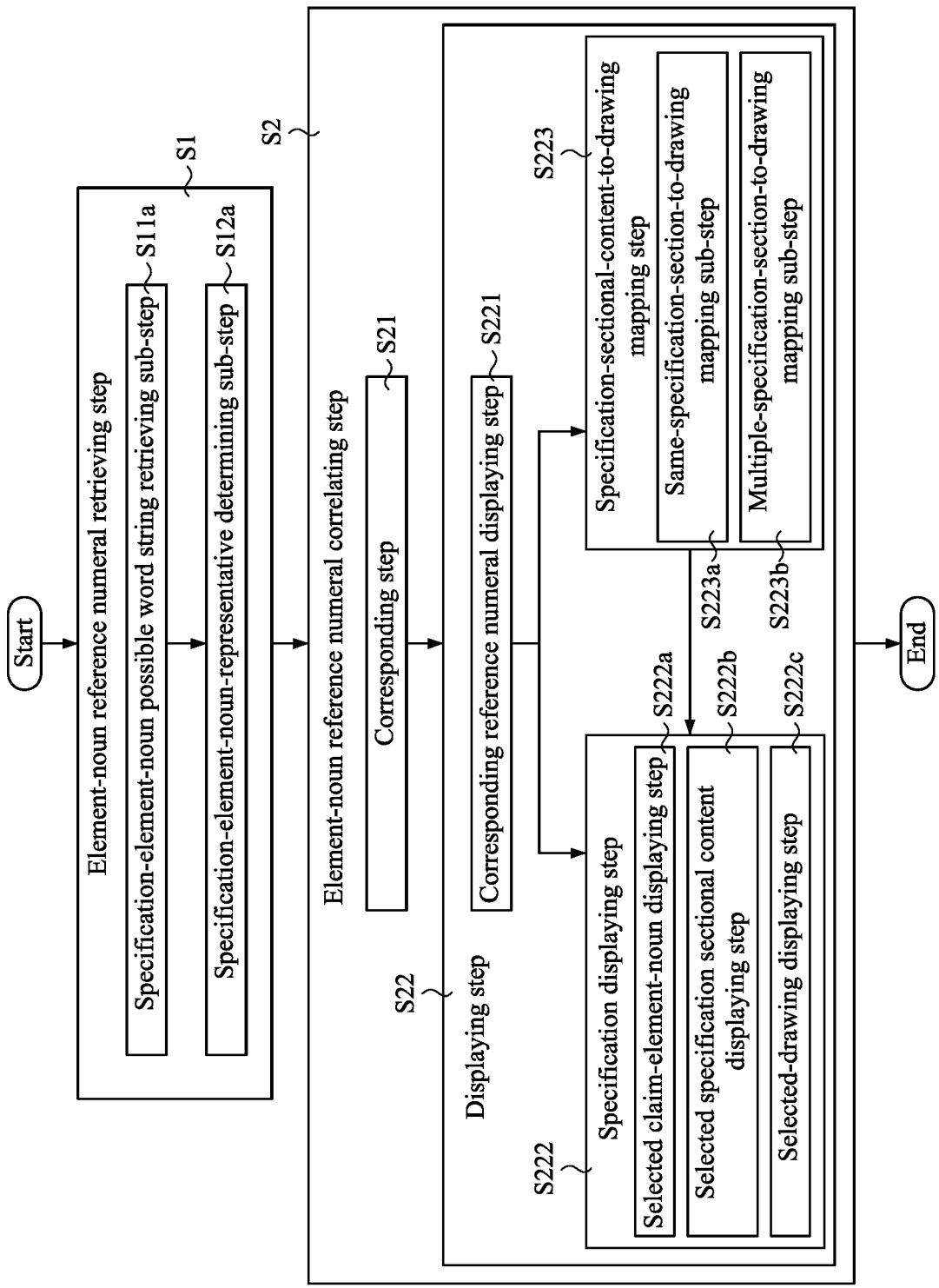
FIG. 6 shows another flow diagram of the computer automatically implemented element-noun reference numeral acquiring method according to one embodiment of the present invention.

As shown in FIG. 6, the element-noun reference numeral retrieving step S1a in the third embodiment includes a specification-element-noun possible word string retrieving sub-step S11a and a specification-element-noun-representative determining sub-step S12a.

In the specification-element-noun possible word string retrieving sub-step S11a, an element-noun reference numeral is firstly retrieved from the specification and is taken as a possible element-noun reference numeral, namely, a possible specification-element-noun reference numeral. Then, it starts from a word which is neighboring to and in front of the possible specification-element-noun reference numeral to search out the specification-element-noun possible word string by searching in a forward sequence for an element-noun determining word, as shown in FIG. 7. The element-noun determining word in the third embodiment is referred to a word that is commonly used in front of an element noun in the specification and the claim. The words between the an element-noun determining word and the possible specification-element-noun reference numeral are then taken as a specification-element-noun possible word string. The element-noun determining word includes any word that is used in front of the element noun such as "said", "the", "the mentioned", "'s", "at", "on", "in", "being", "said mentioned", as shown in FIG. 7. As taking a sentence "the cylinder-shape core part 11 has an attaching part" as an example, the element-noun reference numeral "11" is firstly retrieved from the sentence and is taken as the specification-element-noun reference numeral. Then it starts from the word "part" which is in front of the specification-element-noun reference numeral, then "core", then "cylinder-shape" and then "the" so as to search whether there is any word which is an element-noun determining word. It is found that "the" is one of element-noun determining word as shown in FIG. 7. Therefore, the words between the element-noun determining word "the" and the specification-element-noun reference numeral "11" are "cylinder-shape core part", which are then taken as the specification-element-noun possible word string.

After the operation of the element-noun reference numeral retrieving step S1a in the third embodiment, it may have one specification-element-noun reference numeral, such as 11, 12, 13 or 14, including at least one specification-element-noun possible word string. In some situations, one possible specification-element-noun reference numeral may have a plurality of different specification-element-noun possible word strings. Therefore, a determining procedure of a specification-element-noun-representative determining sub-step S12a is required. The specification-element-noun-representative determining sub-step S12a is operated based on the specification-element-noun reference numerals to arrange the specification-element-noun possible word strings into different specification-element-noun reference numeral group. For example, the specification-element-noun possible word string is retrieved to belong to a specification-element-noun reference numeral group having a reference numeral "11" such that a number of "11" is a group name of the specification-element-noun reference numeral group.

As mentioned, one specification-element-noun reference numeral may have a plurality of different specification-element-noun possible word strings. It results from that the element-noun determining word list is not completely collected where some words may not be included in the element-noun determining word list. For example, the specification-element-noun reference numeral group of "11" may include the words of "cylinder-shape core part", "core part", "surrounding core part" and "approached core part", in which "cylinder-shape", "surrounding" and "approached" are provided neighboring in front of the word "core part" and are not included in the element-noun determining word list. Therefore, in order to obtain a more accurate specification-element-noun possible word string, the specification-element-noun-representative determining sub-step S12a compares all specification-element-noun possible word strings in one specification-element-noun reference numeral group in such a manner that it compares in a reverse sequence beginning from the end of each specification-element-noun possible word string in said one specification-element-noun reference numeral group, and takes the specification-element-noun possible word string having all words containing with the same sequence in all other specification-element-noun possible word strings in said one specification-element-noun reference numeral group as a specification-element-noun-representative of said one specification-element-noun reference numeral group. For example, taking the above four specification-element-noun possible word strings including "cylinder-shape core part", "core part", "surrounding core part" and "approached core part" as an example, a comparison in a reverse sequence beginning from the end of each specification-element-noun possible word string will sequentially obtain the words "part" and "core" as the words that have all words containing with the same sequence in all other specification-element-noun possible word strings in this specification-element-noun reference numeral group. Therefore, "core part" will be taken as a specification-element-noun-representative of said one specification-element-noun reference numeral group of "11".

After the specification-element-noun reference numeral and the specification-element-noun-representative corresponding to the specification-element-noun reference numeral are obtained, the specification-element-noun-representative is retrieved from the claim to obtain a claim-element-noun position so as to display the specification-element-noun reference numeral in a position corresponding to the claim-element-noun position.

Alternatively, the operation of retrieving specification-element-noun-representative from the claim in the specification-element-noun-representative determining sub-step S12a can be operated by comparing the specification-element-noun-representative with the claim-element-noun possible word string in such a manner that it compares in a words-reverse-sequence beginning from an end word of the specification-element-noun-representative and an end word of the claim-element-noun possible word string so as to retrieve the specification-element-noun-representative from the claim.

In the operation that compares all specification-element-noun possible word strings in the specification-element-noun reference numeral group with the claim-element-noun possible word string, in addition that it is operated in a words-reverse-sequence from an end word of each specification-element-noun possible word string and an end word of each claim-element-noun possible word string, the comparison is operated on a basis of a string length from the longest length to the shortest length of the specification-element-noun possible word string to compare the specification-element-noun possible word string with the claim-element-noun possible word string. The reason is that the different specification-element-nouns may have the same word section in their different related positions. For example, both of the two different specification-element-nouns "core part" and "core part attaching member" have the same word section "core part". In order to avoid a wrong searching of the specification-element-noun-representative in the claim such as placing the specification-element-noun reference numeral of the "core part" to be in a position of "the core part" of "the core part attaching member" in the claim, therefore the specification-element-noun-representative determining sub-step S12a compares the specification-element-noun-representative and the claim-element-noun on a basis of a string length from the longest length to the shortest length of the specification-element-noun-representative. In other words, the longest string length "core part attaching member" is compared in the claim so as to determine the specification-element-noun reference numeral for "the core part attaching member" ahead of the comparison of string with a shorter string length "core part". Thereafter, the relatively short word string "core part" is then compared with the other specification-element-noun possible word strings.

It is another situation that when the specification-element-noun-representative determining sub-step S12a is operated and determines that there is not any specification-element-noun-representative of said one specification-element-noun reference numeral group, it retrieves all specification-element-noun possible word strings of said one specification-element-noun reference numeral group from the claim to obtain the claim-element-noun position of each claim-element-noun so as to display the specification-element-noun reference numeral in all positions corresponding to the claim-element-noun position.

No matter that a specification-element-noun-representative is obtained or not, the step "a comparison between the specification-element-noun possible word string and the claim-element-noun possible word string" can be operated. And the operation is operated on a basis of a string length from the longest length to the shortest length of the specification-element-noun possible word string to compare the specification-element-noun possible word string with the claim-element-noun possible word string.

After the claim-element-noun reference numeral corresponding to the claim-element-noun is obtained, the element-noun reference numeral correlating step S2, as shown in FIG. 1, is operated to display the element-noun reference numeral.

With reference to FIG. 1, the displaying step S22 includes a corresponding element-noun reference numeral displaying step S221, a specification displaying step S222 and a specification-sectional-content-to-drawing mapping step S223. The corresponding element-noun reference numeral displaying step S221, the specification displaying step S222 and the specification-sectional-content-to-drawing mapping step S223 respectively display the claim-element-noun reference numeral, the specification, the drawings and the claim-element-noun. The detail is described as follows.

The corresponding element-noun reference numeral displaying step S221 displays the claim-element-noun reference numeral corresponding to the claim-element-noun to correspond the claim-element-noun. In the embodiment of the present invention, the claim-element-noun reference numeral is displayed in a position that is located following the claim-element-noun.

The specification displaying step S222 displays the claim-element-noun in claim and/or a specification sectional content of the specification-element-noun corresponding to the element-noun reference numeral belonging to the claim-element-noun, and/or together with the element-noun reference numeral belonging to the claim-element-noun, and/or together with the element-noun reference numeral belonging to the claim-element-noun. The specification displaying step S222 includes a claim-element-noun-selection displaying step S222a, a specification-sectional-content-selection displaying step S222b and a drawing-selection displaying step S222c.

The claim-element-noun-selection displaying step S222a, when the claim-element-noun or the claim-element-noun reference numeral in the claim is chosen by clicking a mouse on it, is performed to display the specification sectional content to which the chosen claim-element-noun or the claim-element-noun reference numeral in the claim corresponds and/or to display the drawings to which the chosen claim-element-noun or the claim-element-noun reference numeral in the claim corresponds. The present invention is not limited to this. In the above, the specification sectional content, the drawings and the claim-element-noun together with the claim-element-noun reference numeral can be displayed on the same displaying page or on different displaying pages.

The specification-sectional-content-selection displaying step S222b, when the specification sectional content is chosen by clicking a mouse on it, is performed to display at least one drawing corresponding to the chosen specification sectional content, and/or to display at least one claim-element-noun together with at least one claim-element-noun reference numeral in the claim corresponding to the chosen specification sectional content. In the above, the specification sectional content, the drawings and the claim-element-noun together with the claim-element-noun reference numeral can be displayed on the same displaying page or on different displaying pages.

The drawing-selection displaying step S222c, when the drawing is chosen by clicking a mouse on it, is performed to display the specification sectional content corresponding to the chosen drawing, and/or to display the claim-element-noun together with the claim-element-noun reference numeral in the claim corresponding to the chosen drawing. In the above, the specification sectional content, the drawings and the claim-element-noun together with the claim-element-noun reference numeral can be displayed on the same displaying page or on different displaying pages. It is noted that when the element-noun reference numeral retrieving step S1 cannot retrieve the element-noun reference numeral belonging to the chosen claim-element-noun from specification, the element-noun reference numeral retrieving step S1 retrieves and displays a specification-element-noun similar to the chosen claim-element-noun such that the specification-element-noun can be chosen by a user.

Figure 4:
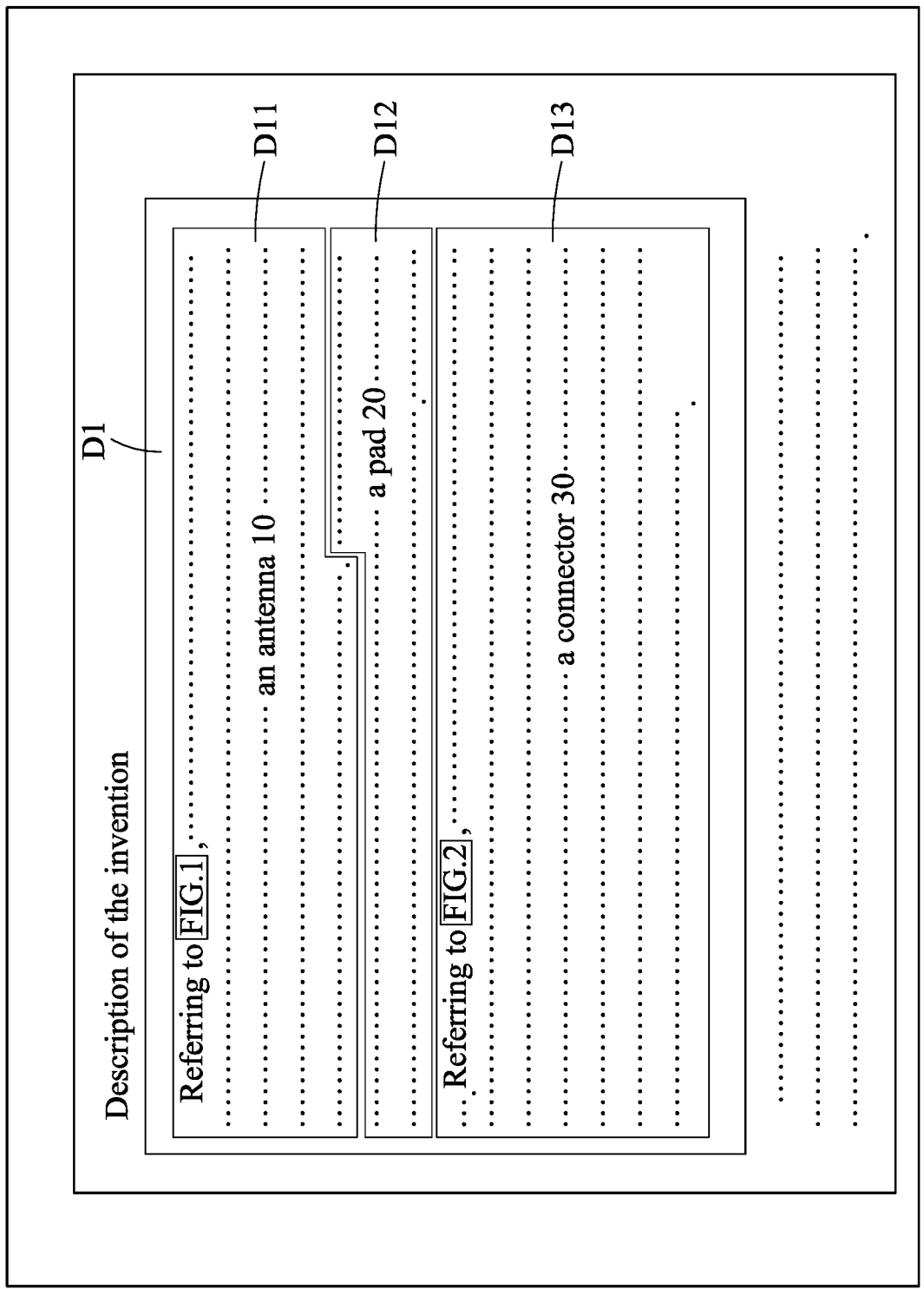
FIG. 4 shows an exemplary description of patent where reference numerals are described for explaining the embodiment of the present invention.

The follows explain a specification-sectional-content-to-drawing mapping step S223. A drawing number is generally indicated in form such as FIG. 3 or FIG. 5 in the specification and the drawings. The specification-sectional-content-to-drawing mapping step S223 is performed to divide and group the specification sectional content as at least one specification-sectional-content group in relation to each drawing. In detail, each one of the specification-sectional-content group is with a specification sectional content from one specification section containing a drawing noun, referring to an initial drawing noun, existing in any position of said one specification section, such as FIG. 3, through continuous specification section if any, until a specification section where another drawing noun, referring to a following drawing noun such as FIG. 4, is located such that the specification-element-noun and the specification-element-noun reference numeral within the specification-sectional-content group are mapped to the initial drawing noun, i.e., FIG. 3. Therefore, (1) the drawing-noun, (2) the specification-element-noun and (3) the element-noun reference numeral belonging to the specification-element-noun are mapped with each other to form a correlated relationship such that the drawing and the specification-sectional-content to which the claim-element-noun corresponds can be displayed in the displaying step S22.

In another embodiment of the present invention, when a specification-element-noun in a specification sectional content is chosen by clicking a mouse on it, the same correlated relationship among the drawing-noun, the specification-element-noun and the element-noun reference numeral belonging to the specification-element-noun as the above is applied such that the drawing noun having been mapped to the specification-element-noun in all specification section is displayed in the position corresponding to the specification-element-noun. Similarly, when a claim-element-noun in the claim is chosen by clicking a mouse on it, the same correlated relationship among the drawing-noun, the specification-element-noun and the element-noun reference numeral belonging to the specification-element-noun is applied such that the drawing noun having been mapped to the claim-element-noun is displayed in the position corresponding to the claim-element-noun. Preferably, when the specification-element-nouns to be displayed, the claim-element-nouns to be displayed or the drawing-nouns to be displayed are a plurality of ones, they can be arranged as belonging to one icon, i.e., only one icon is displayed, such that their selection sub-icons are displayed for a user to select after a user clicked the icon.

The specification-sectional-content-to-drawing mapping step S223 further includes a same-specification-section-to-drawing mapping sub-step S223a and a multiple-specification-section-to-drawing mapping sub-step S223b.

The same-specification-section-to-drawing mapping sub-step S223a is operated to process one same specification section having at least two drawing nouns. With reference to FIG. 4, a specification section D1 having three specification paragraphs D11, D12 and D13 and having drawing-nouns including a drawing-noun 'FIG. 1' in the specification paragraph D11 and a drawing-noun 'FIG. 2' in the specification paragraph D13 is provided where the specification paragraph D12 is not with a drawing-noun. It is noted that a specification paragraph without a drawing-noun such as D12 may be explained as either the specification paragraph is not related to any explanation of drawing-noun or the specification paragraph is still related to the explanation of drawing-noun but merely the drawing-noun is omitted. In the present invention, the specification paragraph D12 is determined as belonging to the specification paragraph D11 on a base of assumption that the drawing-noun is merely omitted but the explanation of the drawing-noun is still sustained. In other words, the present invention assumes the specification paragraph D12 as the continuous explanation of the specification paragraph D11. Accordingly, the same-specification-section-to-drawing mapping sub-step S223a divides and groups the specification paragraph D11 and D12 as one specification-sectional-content group according to the criterion that each specification-sectional-content group is with a specification sectional content from one specification paragraph containing a drawing noun, referring to an initial drawing noun, existing in any position of said one specification paragraph such as D11, through continuous specification paragraph such as D12, until a specification paragraph such as D13 where another drawing noun such as FIG. 2 is. Therefore, the specification paragraphs D11 and D12 are in correlation with the drawing-noun 'FIG. 1'. The drawing-noun 'FIG. 1' is provided to explain the content of the specification paragraphs D11 and D12. Similarly, the specification paragraph D13 is in correlation with the drawing-noun 'FIG. 2'. In one embodiment of the present invention, the same-specification-section-to-drawing mapping sub-step S223a builds and displays the correlation of the specification-element-nouns such as 'an antenna' and 'a pad' and the specification-element-noun reference numerals such as '10' and '20' to the drawing-noun 'FIG. 1', and builds and displays the correlation of the specification-element-noun such as 'a connector' and the specification-element-noun reference numeral such as '30' to the drawing-noun 'FIG. 2' such that the correlation between the claim-element-noun and the specification paragraph is achieved so as to accelerate the reading of the specification paragraph in relation to the claim-element-noun. But the present invention is not limited to this.

Figure 5:
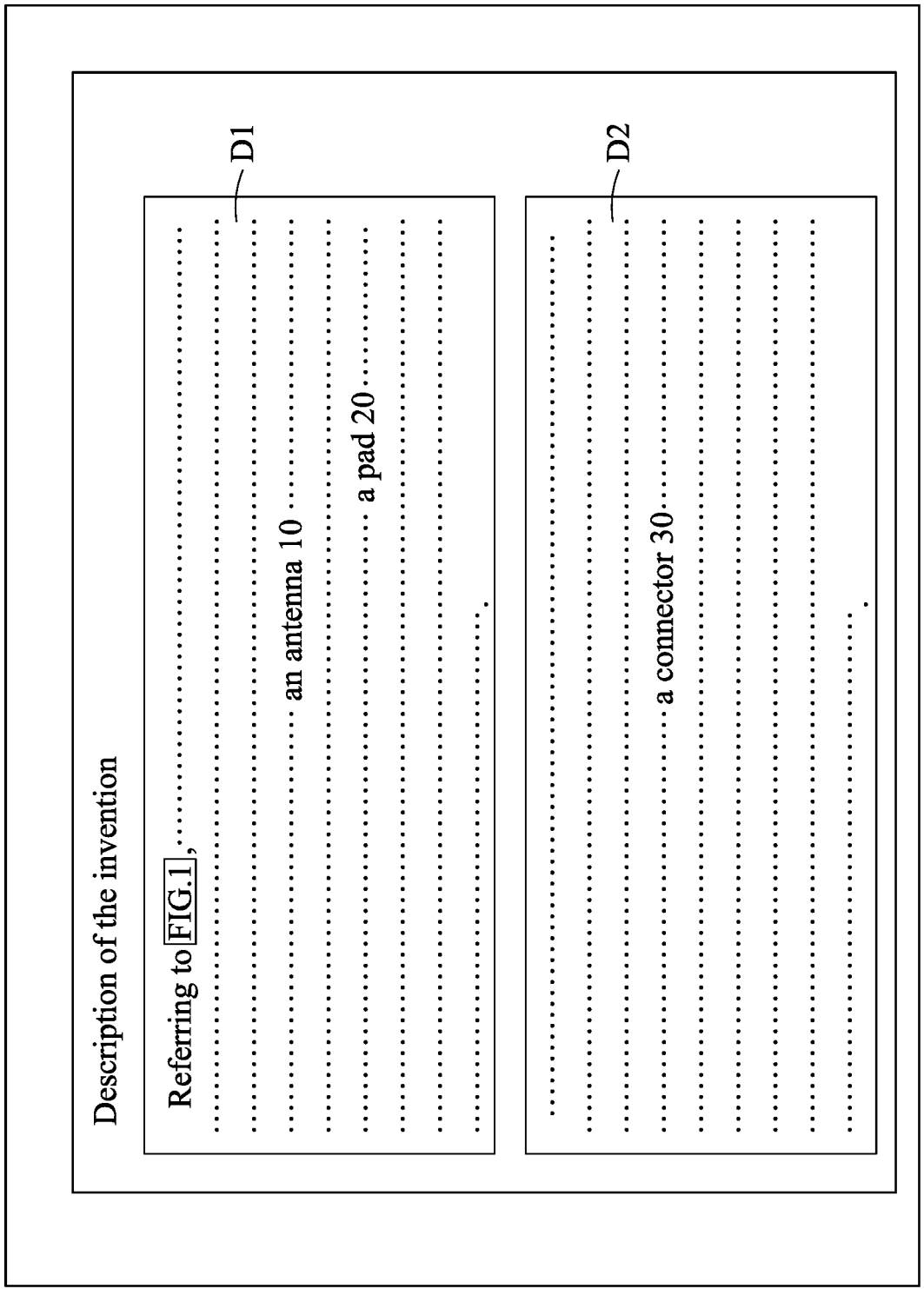
FIG. 5 shows another exemplary description of patent where reference numerals are described for explaining.

The multiple-specification-section-to-drawing mapping sub-step S223b is operated to process multiple specification sections having at least one drawing noun. With reference to FIG. 5, a specification section D1 having one drawing-noun 'FIG. 1' and a specification paragraph D2 is not with a drawing-noun are provided. The multiple-specification-section-to-drawing mapping sub-step S223b arranges the specification section D2 without any drawing-noun as a part of the specification section D1 having the drawing-noun 'FIG. 1'. In one embodiment of the present invention, the multiple-specification-section-to-drawing mapping sub-step S223b builds and displays the correlation of the specification-element-nouns such as 'an antenna' and 'a pad' and the specification-element-noun reference numeral such as '10' and '20' to the drawing-noun 'FIG. 1', and builds and displays the correlation of the specification-element-nouns such as 'an connector' and the specification-element-noun reference numeral such as '30' to the drawing-noun 'FIG. 1' such that the correlation between the claim-element-noun and the specification paragraph is achieved so as to accelerate the reading of the specification paragraph in relation to the claim-element-noun.

The above description is merely the explanation of the preferred embodiment of the present invention. The ordinary person skilled in the art can apply other adjustments according to the claims below and the above description. However, the adjustments still belong to the technical concept of the present invention and fall into the claims of the present invention.

What is claimed is:

1. A computer automatically implemented element-noun reference numeral acquiring method that uses a computer processor to acquires a claim-element-noun reference numeral of a claim, comprising:
   an element-noun reference numeral retrieving step which uses the computer processor to search a specification to retrieve the claim-element-noun reference numeral belonging to a claim-element-noun, and store the claim-element-noun and the searched claim-element-noun reference numeral in a memory; and
   an element-noun reference numeral correlating step which uses the computer processor to establish a correlated relationship between the claim-element-noun reference numeral and the claim-element-noun of the claim stored in the memory, the claim-element-noun reference numeral being obtained by the element-noun reference numeral retrieving step,
   wherein the element-noun reference numeral retrieving step performs any one of the following three manners,
   (1) the first manner: after the claim-element-noun of the claim is retrieved in the claim, it searches the specification to retrieve a specification-element-noun and a specification-element-noun reference numeral so as to connect the specification-element-noun reference numeral and the claim-element-noun, the specification-element-noun being corresponded to the claim-element-noun, and the specification-element-noun reference numeral belonging to the specification-element-noun,
   (2) the second manner: after the specification-element-noun and the specification-element-noun reference numeral belonging to the specification-element-noun are retrieved in the specification, it searches the claim to retrieve the claim-element-noun which corresponds to the specification-element-noun so as to connect the specification-element-noun reference numeral and the claim-element-noun,
   (3) the third manner: after the specification-element-noun reference numeral and at least one specification-element-noun possible word string corresponding to the specification-element-noun reference numeral are retrieved in the specification, it searches the claim to retrieve the claim-element-noun which corresponds to the specification-element-noun possible word string in such a manner that it compares in a reverse sequence beginning from an end of the claim-element-noun and an end of the specification-element-noun possible word string so as to connect the specification-element-noun reference numeral and the claim-element-noun,
   wherein the retrieval of the claim-element-noun in the claim and the retrieval of the specification-element-noun in the specification performed in the first manner and the second manner are executed according to a noun-initial word and an element-noun determining word which are regulated in an element-noun determining rule table employing noun-initial word and part of speech, wherein the retrieval of the specification-element-noun possible word string in the specification performed in the third manner is executed according to an element-noun determining word operated in a reverse sequence beginning from a word proceeding to the specification-element-noun reference numeral, and wherein the third manner further includes a specification-element-noun-representative determining sub-step which groups the specification-element-noun possible word strings into at least one specification-element-noun reference numeral group according to the specification-element-noun reference numerals, compares all specification-element-noun possible word strings in one specification-element-noun reference numeral group in such a manner that compares in a reverse sequence beginning from the end of each specification-element-noun possible word string in said one specification-element-noun reference numeral group, and takes the specification-element-noun possible word string having all words containing with the same sequence in all other specification-element-noun possible word strings in said one specification-element-noun reference numeral group as a specification-element-noun-representative of said one specification-element-noun reference numeral group, and retrieves the specification-element-noun-representative from the claim to obtain a claim-element-noun position so as to display the specification-element-noun reference numeral in a position corresponding to the claim-element-noun position.

2. The computer automatically implemented element-noun reference numeral acquiring method as claimed in claim 1, wherein the retrieval of the specification-element-noun in the specification and the retrieval of the specification-element-noun reference numeral belonging to the specification-element-noun in the specification defined in the second manner of the element-noun reference numeral retrieving step are performed by retrieving an element-noun reference numeral and a specification-element-noun proximately in front of the element-noun reference numeral such that the element-noun reference numeral is taken as the specification-element-noun reference numeral of the specification-element-noun.

3. The computer automatically implemented element-noun reference numeral acquiring method as claimed in claim 1, wherein the element-noun reference numeral correlating step includes a displaying step which displays a correlated relationship between the claim-element-noun reference numeral and the claim-element-noun, the claim-element-noun reference numeral belonging to the claim-element-noun and corresponding to the claim-element-noun.

4. The computer automatically implemented element-noun reference numeral acquiring method as claimed in claim 1, wherein when the specification-element-noun-representative determining sub-step is performed and determines that there is not any specification-element-noun-representative of said one specification-element-noun reference numeral group, it retrieves all specification-element-noun possible word strings of said one specification-element-noun reference numeral group from the claim to obtain the claim-element-noun position of each claim-element-noun so as to display the specification-element-noun reference numeral in a position corresponding to the claim-element-noun position.

5. The computer automatically implemented element-noun reference numeral acquiring method as claimed in claim 4, wherein the retrieval from the claim performed in the specification-element-noun-representative determining sub-step further retrieves a claim-element-noun possible word string in the claim according to the element-noun determining word so as to compare all the specification-element-noun possible word strings in the specification-element-noun reference numeral group with the claim-element-noun possible word string.

6. The computer automatically implemented element-noun reference numeral acquiring method as claimed in claim 5, wherein the operation that compares all specification-element-noun possible word strings in the specification-element-noun reference numeral group with the claim-element-noun possible word string is performed in a words-reverse-sequence from an end word of each specification-element-noun possible word string and an end word of each claim-element-noun possible word string and on a basis of a string length from the longest length to the shortest length of the specification-element-noun possible word string to compare the specification-element-noun possible word string with the claim-element-noun possible word string.

7. The computer automatically implemented element-noun reference numeral acquiring method as claimed in claim 1, wherein the specification-element-noun-representative determining sub-step further retrieves a claim-element-noun possible word string according to the element-noun determining word, and compares the specification-element-noun-representative with the claim-element-noun possible word string in such a manner that it compares in a words-reverse-sequence beginning from an end word of the specification-element-noun-representative and an end word of the claim-element-noun possible word string so as to retrieve the specification-element-noun-representative from the claim.

8. The computer automatically implemented element-noun reference numeral acquiring method as claimed in claim 1, wherein the specification-element-noun-representative determining sub-step compares the specification-element-noun-representative and the claim-element-noun in a words-reverse-sequence from an end word of each specification-element-noun-representative and an end word of each claim-element-noun and on a basis of a string length from the longest length to the shortest length of the specification-element-noun-representative.

9. The computer automatically implemented element-noun reference numeral acquiring method as claimed in claim 1, wherein the element-noun reference numeral correlating step includes a specification displaying step, the specification displaying step displaying a specification sectional content or displaying a specification sectional content together with the claim-element-noun or displaying a specification sectional content together with the claim-element-noun reference numeral, wherein the specification sectional content is a sectional content in the specification containing the specification-element-noun that corresponds to the claim-element-noun and/or corresponds to the claim-element-noun reference numeral.

10. The computer automatically implemented element-noun reference numeral acquiring method as claimed in claim 1, wherein the element-noun reference numeral correlating step includes a specification-sectional-content-to-drawing mapping step, the specification-sectional-content-to-drawing mapping step displaying a drawing and/or displaying a drawing together with the claim-element-noun and/or displaying a drawing together with the claim-element-noun reference numeral, wherein the drawing contains the claim-element-noun and/or the claim-element-noun reference numeral, and wherein the specification-element-noun, the claim-element-noun, the claim-element-noun reference numeral and a drawing-noun belonging to the same specification section are connected with a correlated relationship, the drawing-noun including a number representing a sequence of drawings.

11. The computer automatically implemented element-noun reference numeral acquiring method as claimed in claim 10, wherein when one paragraph has a plurality of the drawing-nouns, the specification-sectional-content-to-drawing mapping step includes a same-specification-section-to-drawing mapping sub-step, the same-specification-section-to-drawing mapping sub-step dividing one paragraph into a plurality of sectional block according to the drawing-noun, combining all sectional blocks without the drawing-noun between two sectional blocks with the different drawing-nouns into a previous one of the two sectional blocks, and connecting the previous one of the two sectional blocks with a correlated relationship with the claim-element-noun and/or the claim-element-noun reference numeral according to a relationship in connecting to the claim-element-noun and/or the claim-element-noun reference numeral.

12. The computer automatically implemented reference numeral acquiring method as claimed in claim 10, wherein the specification-sectional-content-to-drawing mapping step includes a multiple-specification-section-to-drawing mapping sub-step, the multiple-specification-section-to-drawing mapping sub-step combining all sectional blocks without the drawing-noun into the previous sectional block with the drawing-noun, and connecting the previous sectional blocks with a correlated relationship with the claim-element-noun and/or the claim-element-noun reference numeral according to a relationship in connecting to the claim-element-noun and/or the claim-element-noun reference numeral.

13. The computer automatically implemented element-noun reference numeral acquiring method as claimed in claim 10, wherein when the drawing-noun with correlated relationship with the specification-element-noun, the claim-element-noun and/or the claim-element-noun reference numeral is a plurality of ones, each one of the plurality of drawing-nouns is displayed as an icon such that each icon can be chosen.

14. The computer automatically implemented element-noun reference numeral acquiring method as claimed in claim 1, wherein when the element-noun reference numeral retrieving step cannot retrieve the claim-element-noun reference numeral corresponding to the claim-element-noun from the specification, the element-noun reference numeral retrieving step displays a similar specification-element-noun which is the specification-element-noun similar to the claim-element-noun such that the similar specification-element-noun can be chosen.

15. The computer automatically implemented element-noun reference numeral acquiring method as claimed in claim 1, further including a selected-drawing displaying step, the selected-drawing displaying step displaying a specification section on a displaying device when a displaying icon is displayed and chosen in the displaying device.

16. The computer automatically implemented element-noun reference numeral acquiring method as claimed in claim 1, further including a selected-paragraph displaying step, the selected-paragraph displaying step displaying a drawing corresponding to a selected paragraph and/or displaying the claim-element-noun corresponding to the selected paragraph, when the selected paragraph is displayed on the displaying device and is chosen, wherein the selected paragraph is with the claim-element-noun or the specification-element-noun.

\* \* \* \* \*